(12) United States Patent
Choi et al.

(10) Patent No.: US 8,514,769 B2
(45) Date of Patent: Aug. 20, 2013

(54) METHOD OF TRANSMITTING OR RECEIVING CONTROL INFORMATION IN WIRELESS COMMUNICATION SYSTEM AND APPARATUS OF THE SAME

(75) Inventors: Jinsoo Choi, Gyeonggi-do (KR); Hangyu Cho, Gyeonggi-do (KR); Kyujin Park, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 108 days.

(21) Appl. No.: 13/302,217

(22) Filed: Nov. 22, 2011

(65) Prior Publication Data
US 2012/0140677 A1    Jun. 7, 2012

Related U.S. Application Data

(60) Provisional application No. 61/418,815, filed on Dec. 1, 2010, provisional application No. 61/420,776, filed on Dec. 8, 2010.

(51) Int. Cl.
*H04J 3/08*    (2006.01)
*H04H 20/71*    (2008.01)

(52) U.S. Cl.
USPC ............................................ 370/315; 370/312

(58) Field of Classification Search
None
See application file for complete search history.

(56) References Cited

U.S. PATENT DOCUMENTS

2011/0176477 A1*    7/2011    Lee et al. ...................... 370/315
2012/0127918 A1*    5/2012    Choi et al. ..................... 370/315

* cited by examiner

*Primary Examiner* — Clemence Han
(74) *Attorney, Agent, or Firm* — Morgan, Lewis & Bockius LLP

(57) ABSTRACT

A method of transmitting control information by a base station in a wireless communication system is provided. In the method, control information is broadcast, and negative-acknowledgement (NACK) information associated with the broadcasted control information is received from at least one User Equipment (UE), and then the control information is retransmitted to at least one UE in response to the NACK information.

4 Claims, 7 Drawing Sheets

METHOD OF TRANSMITTING OR RECEIVING CONTROL INFORMATION IN WIRELESS COMMUNICATION SYSTEM AND APPARATUS OF THE SAME

This application claims the benefit of U.S. provisional application 61/418,815, filed on Dec. 1, 2010, and U.S. provisional application 61/420,776, filed on Dec. 8, 2010, which are hereby incorporated by reference as if fully set forth herein.

BACKGROUND OF THE INVENTION

1. Field of the Invention

The present invention relates to wireless communication, and more particularly, to a method and apparatus for transmitting or receiving control information by an M2M device, to which Machine to Machine (M2M) communication is applied, in a wireless communication system.

2. Discussion of the Related Art

Although conventional communication are mostly Human to Human (H2H) communication performed between terminals of users via a base station, Machine to Machine (M2M) communication has become possible along with development of communication technology. The term "M2M communication" refers to communication that is performed between electronic devices as the term states. Although, in a broad sense, the term "M2M communication" refers to wired or wireless communication between electronic devices or communication between a device that is controlled by a human and a machine, the term has been generally used recently to indicate wireless communication between electronic devices, i.e., wireless communication between devices.

In the early 1990's when the M2M communication concept was introduced, M2M was considered a concept such as remote control or telematics and associated markets were greatly limited. However, in recent years, M2M communication has been continuously rapidly developed to create a new market that is attracting domestic and global attention. Especially, M2M communication has exerted a great influence upon fields such as Point Of Sale (POS) and fleet management in the security-related application market and a smart meter for automatically measuring the amount of consumed heat or electricity, measuring an operating time of construction equipment and facilities, and remote monitoring machines and facilities. In the future, M2M communication will be used for a wider variety of purposes, in combination with existing mobile communication and wireless high-speed Internet or low-power communication solutions such as Wi-FI and Zig-Bee, and will no longer be limited to the B2B market and will expand its application field into a B2C market.

In the M2M communication era, all machines equipped with a SIM card can transmit and receive data such that it is possible to remotely manage and control all such machines. For example, the field of application of M2M communication technology is greatly broad such that M2M communication technology can be used for a great number of devices and equipment such as cars, trucks, trains, containers, vending machines, and gas tanks.

The power consumption problem is very important for the M2M device due to the characteristics of the M2M device. Thus, the M2M device reports to the base station in a long-term manner or is triggered by an event to report to the base station. That is, while the M2M device mostly remains in an idle state, the M2M device is awoken into an active state at intervals of a long-term period or when an event has occurred. Accordingly, problems such as unnecessary signaling overhead and power consumption may occur if a control information transmission and reception method, which has been applied to the conventional terminal, i.e., an H2H device, is directly applied to the M2M device.

However, no studies have been conducted on a method of transmitting or receiving control information by the M2M device which has different characteristics from the conventional terminal.

SUMMARY OF THE INVENTION

Accordingly, the present invention is directed to a method and apparatus for transmitting or receiving control information in a wireless communication system that substantially obviates one or more problems due to limitations and disadvantages of the related art.

An object of the present invention is to provide a method and apparatus for transmitting or receiving control information in a wireless communication system, which can efficiently support M2M devices while minimizing the influence of a control information transmission and reception procedure for conventional devices, i.e., H2H devices in the wireless communication system.

Objects of the present invention are not limited to those described above and other objects will be clearly understood by those skilled in the art from the following description.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting control information by a base station in a wireless communication system includes broadcasting control information, receiving Negative-Acknowledgement (NACK) information associated with the broadcasted control information from at least one User Equipment (UE), and retransmitting the control information to the at least one UE in response to the NACK information.

The control information is retransmitted by unicast.

The control information is retransmitted by multicast.

The control information includes system configuration information and the system configuration information is broadcasted through a Machine to Machine (M2M)-dedicated header.

The control information includes an indicator indicating a header type associated with whether or not the header is an M2M-dedicated header.

In another aspect of the present invention, a method for receiving control information by a User Equipment (UE) in a wireless communication system includes transmitting Negative-Acknowledgement (NACK) information associated with broadcasted control information, and receiving the control information, the control information being transmitted by unicast.

The control information includes system configuration information and the system configuration information is broadcasted through a Machine to Machine (M2M)-dedicated header.

The control information includes an indicator indicating a header type associated with whether or not the header is an M2M-dedicated header.

In another aspect of the present invention, an apparatus for transmitting control information in a wireless communication system includes a transmitter, a receiver, and a processor configured to control the transmitter to broadcast control information, configured to control the receiver to receive Negative-Acknowledgement (NACK) information associated with the broadcasted control information from at least one User Equipment (UE), and configured to control the transmitter to retransmit the control information to the at least one UE in response to the NACK information.

The processor is configured to control the transmitter to retransmit the control information by unicast.

The processor is configured to control the transmitter to retransmit the control information by multicast.

The control information includes system configuration information and the system configuration information is broadcasted through a Machine to Machine (M2M)-dedicated header.

The control information includes an indicator indicating a header type associated with whether or not the header is an M2M-dedicated header.

In another aspect of the present invention, an apparatus for receiving control information in a wireless communication system includes a transmitter, a receiver, and a processor configured to control the transmitter to transmit Negative-Acknowledgement (NACK) information associated with broadcasted control information, and configured to control the receiver to receive the control information, the control information being transmitted by unicast.

The control information includes system configuration information and the system configuration information is broadcast through a Machine to Machine (M2M)-dedicated header.

The control information includes an indicator indicating a header type associated with whether or not the header is an M2M-dedicated header.

In another aspect of the present invention, a method of receiving control information by a first User Equipment (UE) in a wireless communication system includes attempting to receive control information, the control information being broadcasted by a base station, requesting the broadcasted control information to a second UE adjacent to the first UE if receiving the broadcasted control information is failed, and receiving the broadcasted control information from the second UE.

The requesting step is performed by multicast.

In another aspect of the present invention, an apparatus for receiving control information in a wireless communication system includes a transmitter, a receiver, and a processor configured to control the receiver to attempt to receive control information, the control information being broadcasted by a base station, configured to control the transmitter to request the broadcasted control information to a User Equipment adjacent to the apparatus if receiving the broadcasted control information is failed, and configured to control the receiver to receive the broadcasted control information from the UE.

The processor is configured to control the transmitter to request the control to the UE by multicast.

According to embodiments of the present invention, it is possible to efficiently use M2M devices by removing unnecessary signaling overhead and power consumption while minimizing the influence upon conventional User Equipments in a wireless communication system.

Advantages of the present invention are not limited to those described above and other advantages will be clearly understood by those skilled in the art from the following description.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, although the following descriptions will be given in detail with reference to the case in which the wireless communication system is an IEEE 802.16 system, the following descriptions, except descriptions specific to IEEE 802.16, may be applied to any other wireless communication system (for example, an LTE/LTE-A system).

In some instances, known structures and devices are omitted or shown in block diagram form, focusing on important features of the structures and devices, so as not to obscure the concept of the present invention. The same reference numbers will be used throughout this specification to refer to the same or like parts.

In the following description, the term "terminal" is used to generally describe any mobile or stationary user device such as a User Equipment (UE), a Mobile Station (MS), or an Advanced Mobile Station (AMS). In addition, the term "base station" is used to generally describe any network node that communicates with the terminal such as a Node B, an eNode B, or an Access Point (AP).

In a wireless communication system, a User Equipment can receive information through downlink from a base station and can transmit information through uplink. Information transmitted or received by the User Equipment includes data and various control information and various physical channels are provided according to the type or usage of the information transmitted or received by the User Equipment.

Figure 1:
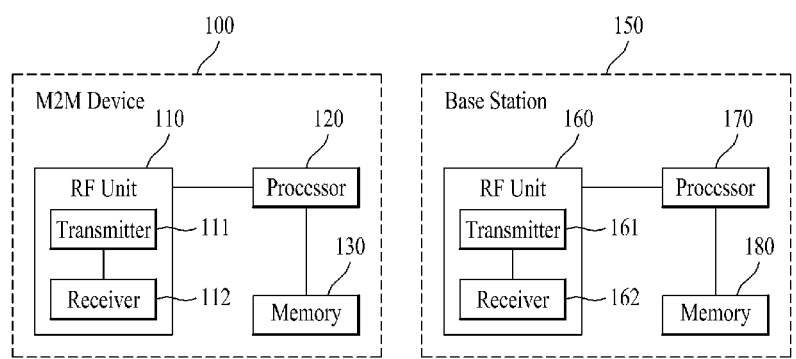
FIG. 1 illustrates a configuration of an M2M device and a base station according to an embodiment of the present invention.

FIG. 1 illustrates a configuration of an M2M device and a base station according to an embodiment of the present invention.

As shown in FIG. 1, the M2M device 100 and the base station 150 may include RF units 110 and 160, processors 120 and 170, and memories 130 and 180, respectively. The RF units 110 and 160 may include transmitters 111 and 161 and receivers 112 and 162, respectively. The transmitter 111 and the receiver 112 of the M2M device 100 may be configured so as to transmit and receive signals to and from the base station 150 and other M2M devices and the processor 120 may be functionally connected to the transmitter 111 and the receiver 112 so as to control processes which the transmitter 111 and the receiver 112 perform to transmit and receive signals to and from other devices. The processor 120 may transmit a signal to the transmitter 111 after performing a variety of processes upon the signal and may process a signal received by the receiver 112. When needed, the processor 120 may store information included in an exchanged message in the memory 130. Using such a structure, the M2M device 100 can perform methods according to various embodiments described below.

Although not illustrated in FIG. 1, the M2M device 100 may include various additional components according to the type of application. When the M2M device 100 is an M2M device for smart measurement, the M2M device 100 may include an additional component for power measurement or the like and such a power measurement operation may be controlled by the processor 120 shown in FIG. 1 or by a separate processor (not shown).

Although FIG. 1 illustrates the case in which communication is performed between the M2M device 100 and the base station 150, M2M communication methods according to the present invention may be performed between M2M devices and each of the devices may have the same configuration as that shown in FIG. 1 and perform methods according to various embodiments described below.

The transmitter 161 and the receiver 162 of the base station 150 may be configured so as to transmit and receive signals to and from another base station, an M2M server, and M2M devices and the processor 170 may be functionally connected to the transmitter 161 and the receiver 162 so as to control processes which the transmitter 161 and the receiver 162 perform to transmit and receive signals to and from other devices. The processor 170 may transmit a signal to the transmitter 161 after performing a variety of processes upon the signal and may process a signal received by the receiver 162. When needed, the processor 170 may store information included in an exchanged message in the memory 180. Using such a structure, the base station 150 can perform methods according to various embodiments described below.

The processors 120 and 170 of the RF unit 110 and the base station 150 instruct (for example, control, adjust, or manage) operations of the RF unit 110 and the base station 150, respectively. The processors 120 and 170 may be connected to the memories 130 and 180 that store program code and data. The memories 130 and 180 are connected to the processors 120 and 170 and store operating systems, applications, and general files, respectively.

Each of the processors 120 and 170 may also be referred to as a controller, a microcontroller, a microprocessor, or a microcomputer. Each of the processors 120 and 170 may be implemented by hardware, firmware, software, or any combination thereof. In the case in which the embodiments of the present invention are implemented by hardware, the processors 120 and 170 may include application specific integrated circuits (ASICs), digital signal processors (DSPs), digital signal processing devices (DSPDs), programmable logic devices (PLDs), field programmable gate arrays (FPGAs), processors, controllers, microprocessors, or the like.

In the case in which the embodiments of the present invention are implemented by firmware or software, the firmware or software may be configured so as to include modules, processes, functions, or the like which perform the features or operations of the present invention and the firmware or software configured so as to implement the present invention may be provided in the processors 120 and 170 or may be stored in the memories 130 and 180 so as to be executed by the processors 120 and 170.

Such a device that communicates in an M2M manner as described above can be referred to as an M2M device, an M2M communication device, or a Machine Type Communication (MTC) device. On the other hand, a conventional terminal (or User Equipment) may be referred to as a Human Type Communication (HTC) terminal or a Human to Human (H2H) device.

The number of M2M devices in a network will gradually increase as the number of machine application types increases. Such machine application types that are under discussion include, but are not limited to, (1) security, (2) public safety, (3) tracking and tracing, (4) payment, (5) healthcare, (6) remote maintenance and control, (7) metering, (8) consumer devices, (9) Point Of Sale (POS) and fleet management in the security-related application market, (10) communication between vending machines, (11) a smart meter for automatically measuring the amount of consumed heat or electricity, measuring an operating time of construction equipment and facilities, and remote monitoring machines and facilities, and (12) surveillance video communication of a surveillance camera, and various other machine application types are also under discussion. As the number of machine application types increases, the number of M2M devices will significantly increase compared to the number of conventional devices, i.e., H2H devices.

As described above, the M2M device is characterized in that it transmits data to a base station in a long term manner or is triggered by an event to transmit data. That is, while the M2M device mostly remains in an idle state, the M2M device may be awoken into an active state at intervals of a long-term period or when an event has occurred.

Most M2M devices have low mobility or have no mobility (i.e., are stationary). As the number of stationary M2M device application types persistently increases, a very large number of such M2M devices will become present in the same base station.

One feature of the M2M device is a time-controlled operation. The system may support the time-controlled operation and the M2M device may transmit or receive data only within a predefined time interval.

Another feature of the M2M device is low mobility or no mobility. That is, the M2M device may remain stationary for a long time. The system may simplify or optimize mobility-related operations.

Due to such a feature, control information transmission and update procedures applied to conventional User Equipments (H2H devices) may be inefficient for the M2M device. Thus, there is a need to partially change the control information transmission and update procedures applied to conventional User Equipments within a range in which the procedures are not significantly changed.

The following is a brief description of control information transmission and update procedures for an IEEE 802.16m, which is an exemplary wireless communication system. The control information may include a system parameter, system information, system configuration information, and the like.

In the IEEE 802.16m system, a base station transmits essential system parameters and system configuration information to a User Equipment by incorporating them into a superframe header (SFH) which is one downlink control channel. Specifically, the superframe header includes system information required for the User Equipment to perform initial network entry, network re-entry, or handover. The superframe header is classified into a primary superframe header (P-SFH) and a secondary superframe header (S-SFH). The base station transmits a P-SFH to the User Equipment on every superframe. The base station may also transmit an S-SFH to the User Equipment on every superframe. The superframe header may be referred to as a Broadcast CHannel (BCH) and may be used as having the same meaning as the BCH. The BCH is also classified into a primary BCH (P-BCH) and a secondary BCH (S-SCH).

A S-SFH IE is mapped to the S-SFH. The S-SFH IE may be classified into three S-SFH sub-packet IEs, i.e., an S-SFH SP1 IE, an S-SFH SP2 IE, and an S-SFH SP3 IE. The S-SFH SP3 IE includes an SP scheduling periodicity information field and an S-SFH change cycle field which indicate the transmission period and S-SFH change cycle of each of the S-SFH SP1, SP2, and SP3. The transmission periods of the S-SFH SPs according to the SP scheduling periodicity information are shown in Table 1.

TABLE 1

| SP scheduling periodicity information | Transmission periodicity of S-SFH SP1 | Transmission periodicity of S-SFH SP2 | Transmission periodicity of S-SFH SP3 |
|---|---|---|---|
| 0000 | 40 ms | 80 ms | 160 ms |
| 0001 | 40 ms | 80 ms | 320 ms |
| 0010-1111: reserved | | | |

Figure 2:
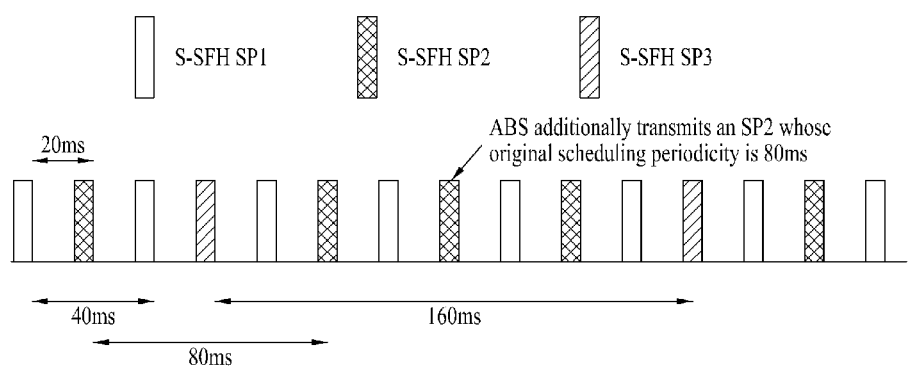
FIG. 2 illustrates a periodic transmission procedure of S-SFH SP IEs.

FIG. 2 illustrates a periodic transmission procedure of S-SFH SP IEs when an SP scheduling periodicity information field indicates '0000'.

From FIG. 2, it can be seen that an S-SFH SP1 is transmitted at intervals of 40 ms, an S-SFH SP2 is transmitted at intervals of 80 ms, and an S-SFH SP3 is transmitted at intervals of 160 ms. In addition, when content of S-SFH SP IEs has changed, the base station may additionally transmit the changed S-SFH SP IEs on a superframe which carries only a P-SFH (i.e., in which no S-SFH is scheduled).

Figure 3:
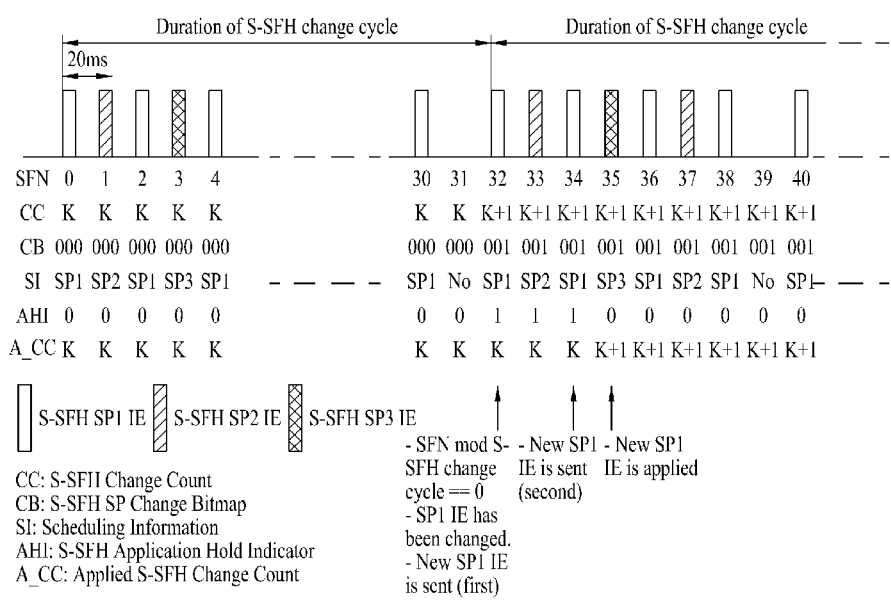
FIG. 3 illustrates an update procedure for a changed S-SFH SP IE.

FIG. 3 illustrates an update procedure for a changed S-SFH SP IE.

As shown in FIG. 3, S-SFH SP IEs (for example, S-SFH SP1 IE, S-SFH SP2 IE, S-SFH SP3 IE) are transmitted at intervals of different periods on superframes scheduled to the SPs. Such SP scheduling periodicity information is included in the S-SFH SP3 IE as described above.

A P-SFH IE, which includes S-SFH scheduling information, an S-SFH change count, an S-SFH SP change bitmap, or the like, is transmitted on every superframe. The S-SFH scheduling information indicates whether the S-SFH SP IE on the corresponding superframe corresponds to an S-SFH SP1 IE, an S-SFH SP2 IE, or an S-SFH SP3 IE. The S-SFH change count indicates an S-SFH change count value for S-SFH SP IEs that are transmitted in an S-SFH change cycle. Accordingly, the S-SFH change count value is kept constant when the S-SFH SP IEs are not changed. The S-SFH SP change bitmap indicates an S-SFH SP IE changed in association with the current S-SFH change count.

In the case in which the S-SFH SP1 IE is changed in order to guarantee time required for the User Equipment to apply the changed S-SFH SP IEs, their changed content is applied to a superframe immediately next to second regular transmission of the changed S-SFH SP1 IE. If the S-SFH SP2 IE is changed, the changed content is applied to a superframe immediately next to second regular transmission of the changed S-SFH SP2 IE. On the other hand, if the S-SFH SP3 IE is changed, the changed content is applied to a superframe immediately next to first regular transmission of the changed S-SFH SP3 IE.

Based on the S-SFH change count, the S-SFH SP change bitmap, and the S-SFH change cycle, and the like, the User Equipment may determine whether or not to decode S-SFH SP IEs associated with update of system configuration information on the current superframe. Specifically, the User Equipment compares S-SFH change count values of a received P-SFH IE and a P-SFH IE that has been stored last in the User Equipment. When the two S-SFH change count values are not different, the User Equipment does not decode the S-SFH IE while the S-SFH change count is not changed. If the difference between the two S-SFH change count values is 1, the User Equipment needs to update S-SFH SP IEs in which the bit in the S-SFH SP change bitmap is set to 1. If the difference between the two S-SFH change count values is greater than 1, the User Equipment needs to update all S-SFH SP IEs.

Referring to FIG. 3, the size of the S-SFH change cycle corresponds to 32 superframes and the transmission periods of the S-SFH S-SFH SP1 IE, the S-SFH SP2 IE, and the S-SFH SP3 IE correspond to 40 ms, 80 ms, and 160 ms, respectively. SFN stands for superframe number, CC stands for S-SFH change count, and CB stands for S-SFH SP change bitmap.

Since the S-SFH change count has been increased by 1 in the superframe number 32, the User Equipment decides to receive and decode an S-SFH SP1 IE in the S-SFH change cycle. The content of the changed S-SFH SP1 IE is applied to the superframe number 35 next to second regular transmission of the S-SFH SP1 IE.

On the other hand, there is a need to partially modify the control information transmission and update procedures taking into consideration the characteristics of the M2M device. The following is a description of control information transmission and reception and update procedures for an M2M device.

First, a control information transmission or reception structure for the M2M device is described below. The control information includes a system parameter, system information, system configuration information, and the like as described above. Although the following description will be given with reference to an example in which the control information is system configuration information for ease of explanation, the present invention is not limited to this example.

In a first embodiment, system configuration information for the M2M device may be transmitted using an S-SFH SP3. The S-SFH SP3 is useful when the transmission period of required system configuration information is not short since the transmission period of the S-SFH SP3 is 160 ms or 320 ms.

In a second embodiment, system configuration information for the M2M device may be transmitted on a superframe on which only P-SFH is transmitted and S-SFH transmission is not scheduled.

In a third embodiment, an S-SFH SP dedicated to the M2M device may be added using an S-SFH size extension field in the P-SFH IE and system configuration information of the M2M device may be transmitted through the S-SFH IE dedicated to the M2M device rather than through the conventional S-SFH SP1, SP2, and SP3 IEs. Taking into consideration the fact that only the extended S-SFH SP dedicated to the M2M device is added while transmission structures, modulation methods, and transmission periods, and change periods of the conventional S-SFH SP1, SP2, and SP3 remain unchanged, the conventional User Equipment (H2H device) may receive and decode system configuration information through the S-SFH SP1, SP2 and SP3 and the M2M device may receive and decode system configuration information through the added S-SFH SP. Since each User Equipment receives and decodes an S-SFH SP IE only in the corresponding S-SFH SP, it is possible to prevent an unnecessary procedure for receiving and decoding all S-SFH SP IEs which needs to be performed when such S-SFH SP IEs are not discriminated from one another. On the other hand, the S-SFH size extension field may be used as a type indicator which indicates whether or not the corresponding S-SFH SP is dedicated to the M2M device.

The format of the conventional P-SFH IE is as shown in Table 2. The S-SFH size extension field is a region which is originally reserved for further S-SFH extension addition.

TABLE 2

| Syntax | Size (bit) | Notes |
| --- | --- | --- |
| P-SFH IE format ( ) { | | |
| LSB of superframe number | 4 | Part of superframe number |
| S-SFH change count | 4 | Indicates the value of S-SFH change count associated with the S-SFH SPx IE(s) transmitted in this S-SFH change cycle |
| S-SFH size extension | 2 | 0b00: $Size_{SPx, extension} = 0$<br>0b01: $Size_{SPx, extension} = 8$<br>0b10: $Size_{SPx, extension} = 16$<br>0b11: $Size_{SPx, extension} = 24$ |

The following is a description of a procedure for updating S-SFH IEs received by the M2M device. Due to the features of the M2M device such as time-controlled operation and low mobility, the amount of information included in S-SFH IEs is smaller than the conventional User Equipment (i.e., the H2H device).

Accordingly, it is possible to consider a method of reducing the number of transmissions required for S-SFH SP IEs (for example, two transmissions required for S-SFH SP1 and SP2 IEs) to 1 in the case of the conventional User Equipment (H2H device). This may reduce and optimize the update procedure of S-SFH SP IEs. Specifically, this method is advantageous in the case in which cooperation between M2M devices is supported and an updated S-SFH IE can be received from an adjacent M2M device.

In addition, it is possible to limit the number of receptions of an S-SFH SP IE in the M2M device to one while maintaining the number of transmissions required for S-SFH SP IEs (for example, two transmissions required for S-SFH SP1 and SP2 IEs) to one for the conventional User Equipment (H2H device).

On the other hand, in the case in which the number of transmissions of an S-SFH SP IE of each type is reduced to one or the number of receptions is limited to one for the M2M device, there may be a problem in dealing with reception failure.

Figure 4:
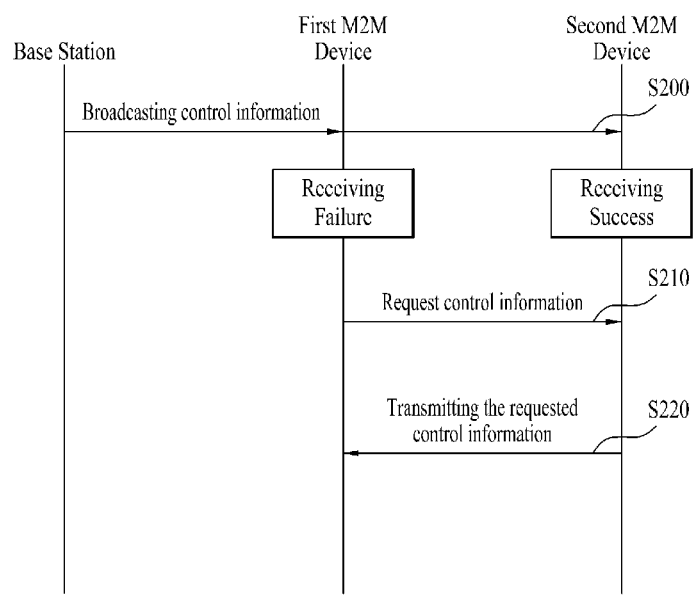
FIG. 4 illustrates a method for transmitting or receiving control information according to an embodiment of the present invention.

FIG. 4 illustrates a method for transmitting or receiving control information according to an embodiment of the present invention. As shown in FIG. 4, a base station may broadcast control information to at least one M2M device (S200). Here, the control information may correspond to system information, a system parameter, system configuration information, and an SFH IE. As described above, the control information may be broadcasted using an S-SFH SP3 IE, may be broadcasted on a superframe in which no S-SFH has been scheduled, or may be broadcasted using an S-SFH SP dedicated to the M2M device. In addition, the base station may transmit an S-SFH SP of each type only once. A first M2M device may fail to receive the control information broadcasted from the base station while a second M2M device may successfully receive the control information. Here, the first M2M device may request the broadcasted control information to the second M2M device which has successfully received the control information (S210). In response to this request, the second M2M device may transmit the broadcasted control information to the second M2M device (S220). The first M2M device may determine whether or not to update control information based on the broadcasted control information received from the second M2M device and may then perform a subsequent procedure. Here, the first M2M device may request the control information only to the second M2M device by unicast. Although this embodiment has been described only with reference to the case in which the first M2M device requests the broadcast control information only from the second M2M device, it is apparent that the first M2M device may also request the control information to a plurality of M2M devices by multicast.

Figure 5:
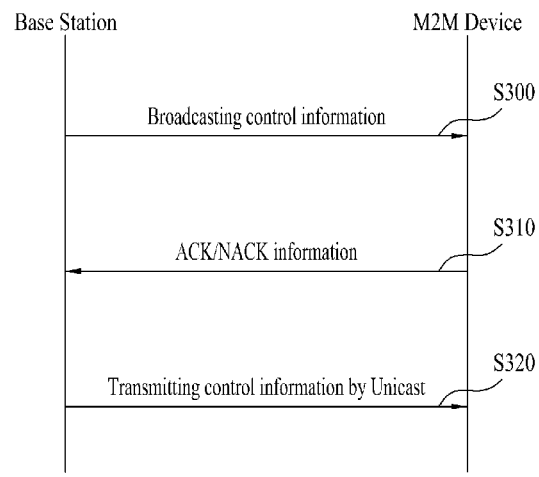
FIG. 5 illustrates a method for transmitting or receiving control information according to another embodiment of the present invention.

FIG. 5 illustrates a method for transmitting or receiving control information according to another embodiment of the present invention.

As shown in FIG. 5, a base station may broadcast control information to at least one M2M device (S300). Here, the control information may correspond to system information, a system parameter, system configuration information, and an SFH IE. As described above, the control information may be broadcasted using an S-SFH SP3 IE, may be broadcasted on a superframe in which no S-SFH has been scheduled, or may be broadcasted using an S-SFH SP dedicated to the M2M device. In addition, the base station may transmit an S-SFH SP of each type only once. The M2M device may receive an S-SFH SP of each type only once. When the M2M device has successfully received control information broadcasted from the base station, the M2M device may transmit acknowledgement (ACK) information to the base station to notify the base station that the M2M device has successfully received the broadcasted control information and, when the M2M device has failed to receive the broadcasted control information, the M2M device may transmit negative-acknowledgement (NACK) information to the base station to notify the base station that the M2M device has failed to receive the broadcasted control information (S310). The base station may retransmit the control information to the M2M device by unicast when the base station has received the NACK information (S320). The M2M device may determine whether or not to update control information based on the broadcasted control information received from the base station and may then perform a subsequent procedure. When the base station has received NACK information from a plurality of M2M devices, the base station may retransmit the control information to the plurality of M2M devices, which have transmitted the NACK information, by multicast.

This embodiment has been described with reference to an SFH IE as an example of the control information. However, this embodiment may also be equally applied to transmission and reception of an AAI-System Configuration Descriptor (SCD) message and a non-user specific AMAP (NUS AMAP).

The state of the User Equipment may be broadly classified into a connected state and a disconnected state. In the connected state, the operation mode of the User Equipment may be classified into a normal mode and a sleep mode. Here, the sleep mode employs a sleep mode pattern including a sleep interval and a listening interval granted by the base station through transmission and reception of an AAI-SLP-REQ/AAI-SLP-RSP message between the User Equipment and the base station in order to save power of the User Equipment.

In the sleep mode, the User Equipment is awoken before the listening interval in order to receive control information, specifically, an SFH. Specifically, the User Equipment is awoken at the start point of an S-SFH change cycle. Here, the User Equipment needs to receive and decode S-SFH SP IEs in the case in which content of the S-SFH SP IEs has changed. Here, the S-SFH SP1 IE and SP2 IE need to be transmitted twice and the S-SFH SP3 IE needs to be transmitted once as described above.

Figure 6:
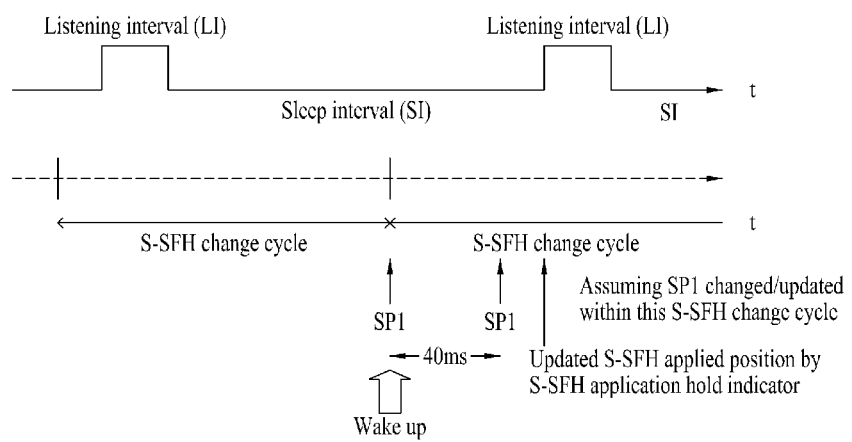
FIG. 6 illustrates a procedure for receiving an SFH by a User Equipment in a sleep mode.

FIG. 6 illustrates a procedure for receiving an SFH by a User Equipment in a sleep mode. As shown in FIG. 6, assuming that content of an S-SFH SP1 IE has changed in an S-SFH change cycle, the User Equipment needs to await transmission of a second S-SFH SP1 IE that is 40 ms later in the case in which the User Equipment has failed to decode an S-SFH SP1 IE that has been transmitted first although the User Equipment has successfully received the S-SFH SP1 IE. The User Equipment may need to wait up to 80 ms for reception when taking into consideration a situation in which the content of an S-SFH SP2 IE is changed. Since it is not possible to transmit and receive data until changed S-SFH SP IEs are applied, the state of the User Equipment, in which the User Equipment is awoken to await reception, may cause unnecessary power consumption. Thus, there is a need to modify the SFH reception procedure in the sleep mode for the M2M device.

Figure 7:
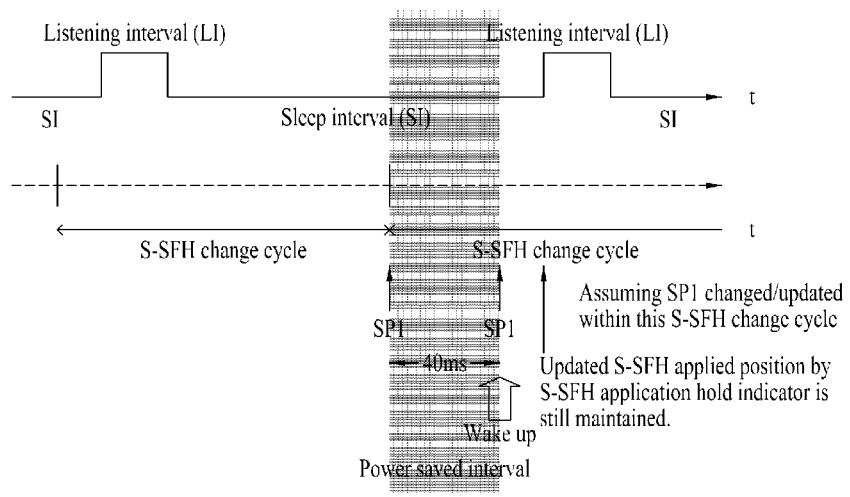
FIG. 7 illustrates a procedure for receiving an SFH by an M2M device in a sleep mode.

FIG. 7 illustrates a procedure for receiving an SFH by an M2M device in a sleep mode. As shown in FIG. 7, it is possible to fix the transmission positions of S-SFH SP IEs in an S-SFH change cycle. For example, it is possible to allow an S-SFH SP1 IE to always be transmitted on a first superframe in the S-SFH change cycle (i.e., at the start point of the S-SFH change cycle). Since the M2M device can identify the superframe number in the S-SFH change cycle, the M2M device can also identify a superframe number on which the second S-SFH SP1 IE is transmitted in the S-SFH change cycle. Accordingly, the M2M device is configured so as to be awoken to receive the S-SFH SP1 IE on a superframe in which the second S-SFH SP1 IE is transmitted. More specifically, after the M2M device receives and decodes a P-SFH IE on the superframe, the M2M device checks whether or not an S-SFH SP IE has changed and checks which S-SFH SP IE has been changed. In the case in which no S-SFH SP IEs have changed, the M2M device may return to the sleep mode until the start point of the listening interval is reached. In the case in which S-SFH SP IEs have changed, the M2M device receives and decodes the changed S-SFH SP IEs. In the case in which the M2M device has failed to decode the changed S-SFH SP IEs, the M2M device may request and receive updated S-SFH SP IEs from an adjacent M2M device or may request retransmission of S-SFH SP IEs from the base station. This method may also be equally applied to an S-SFH SP2 IE.

As is apparent from the above description, according to the embodiments of the present invention, it is possible to efficiently use M2M devices by removing unnecessary signaling overhead and power consumption while minimizing the influence upon conventional User Equipments (or terminals) in a wireless communication system.

The above embodiments are provided by combining components and features of the present invention in specific forms. The components or features of the present invention should be considered optional unless explicitly stated otherwise. The components or features may be implemented without being combined with other components or features. The embodiments of the present invention may also be provided by combining some of the components and/or features. The order of the operations described above in the embodiments of the present invention may be changed. Some components or features of one embodiment may be included in another embodiment or may be replaced with corresponding components or features of another embodiment. It will be apparent that claims which are not explicitly dependent on each other can be combined to provide an embodiment or new claims can be added through amendment after this application is filed.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced within the scope of the invention.

What is claimed is:

1. A method of receiving control information by a first User Equipment (UE) in a wireless communication system, the method comprising:
   attempting to receive control information, the control information being broadcasted by a base station;
   requesting the broadcasted control information to a second UE adjacent to the first UE if receiving the broadcasted control information is failed; and
   receiving the broadcasted control information from the second UE.

2. The method of claim 1, wherein the requesting step is performed by multicast.

3. An apparatus for receiving control information in a wireless communication system, the apparatus comprising:
   a transmitter;
   a receiver; and
   a processor configured to control the receiver to attempt to receive control information, the control information being broadcasted by a base station, configured to control the transmitter to request the broadcasted control information to a User Equipment (UE) adjacent to the apparatus if receiving the broadcasted control information is failed, and configured to control the receiver to receive the broadcasted control information from the UE.

4. The apparatus of claim 3, wherein the processor is configured to control the transmitter to request the control information to the UE by multicast.

\* \* \* \* \*